United States Patent
Jalloul et al.

(10) Patent No.: US 7,133,433 B2
(45) Date of Patent: Nov. 7, 2006

(54) METHOD AND APPARATUS FOR ENHANCING DATA RATES IN SPREAD SPECTRUM COMMUNICATION SYSTEMS

(75) Inventors: Louay M. A. Jalloul, San Jose, CA (US); Abhijit G. Shanbhag, San Jose, CA (US)

(73) Assignee: Infineon Technologies AG (DE)

( * ) Notice: Subject to any disclaimer, the term of this patent is extended or adjusted under 35 U.S.C. 154(b) by 683 days.

(21) Appl. No.: 10/226,666

(22) Filed: Aug. 21, 2002

(65) Prior Publication Data

US 2003/0076872 A1    Apr. 24, 2003

Related U.S. Application Data

(60) Provisional application No. 60/313,991, filed on Aug. 21, 2001.

(51) Int. Cl.
H04B 1/69    (2006.01)
(52) U.S. Cl. .................. 375/141; 375/152; 370/210
(58) Field of Classification Search .............. 375/141, 375/152; 370/210
See application file for complete search history.

(56) References Cited

U.S. PATENT DOCUMENTS

| | | | |
|---|---|---|---|
| 5,418,813 A | 5/1995 | Schaffner et al. | |
| 5,579,304 A * | 11/1996 | Sugimoto et al. | 370/342 |
| 5,825,807 A | 10/1998 | Kumar | |
| 5,909,434 A | 6/1999 | Odenwalder et al. | |
| 6,101,225 A | 8/2000 | Thorson | |
| 6,137,788 A * | 10/2000 | Sawahashi et al. | 370/342 |
| 6,188,717 B1 | 2/2001 | Kaiser et al. | |
| 6,240,143 B1 * | 5/2001 | Shanbhag | 375/295 |
| 6,256,290 B1 | 7/2001 | Ramesh | |
| 6,259,688 B1 | 7/2001 | Schilling et al. | |
| 6,731,674 B1 * | 5/2004 | Yang et al. | 375/146 |
| 6,963,601 B1 * | 11/2005 | Kim et al. | 375/146 |
| 2003/0206577 A1 * | 11/2003 | Liberti et al. | 375/152 |

FOREIGN PATENT DOCUMENTS

| WO | WO-99/13599 | 3/1999 |
|---|---|---|
| WO | WO-00/42711 | 7/2000 |

OTHER PUBLICATIONS

Klein, A., Data Detection Algorithms Specially Designed for the Dwonlink of CDMA Mobile Radio Systems; IEEE Veh. Tech. Conf.; p. 203-207; May 4-7, 1997.*
Physical Layer Standard for cdma2000 Spread Spectrum Systems, 3rd Generation Partnership Project 2 "3GPP2", Jul. 1999.
Medium Access Conrol (MAC) Standard for cdma2000 Spread Spectrum Systems, Release 0-Addendum 2, 3rd Generation Partnership Project 2, "3GPP2", Jun. 15, 2001.

* cited by examiner

*Primary Examiner*—Khai Tran
*Assistant Examiner*—Cicely Ware
(74) *Attorney, Agent, or Firm*—Dickstein, Shapiro, LLP.

(57) ABSTRACT

A high data transmitter and a high data receiver that uses both Walsh codes and quasi orthogonal functions in spreading and despreading transmitted and received signals.

17 Claims, 5 Drawing Sheets

METHOD AND APPARATUS FOR ENHANCING DATA RATES IN SPREAD SPECTRUM COMMUNICATION SYSTEMS

Priority of provisional application No. 60/313,991 filed on Aug. 21, 2001 in United States is claimed under 35 U.S.C. § 119.

BACKGROUND OF THE INVENTION

This invention relates to the field of spread spectrum communications and, in particular, to communications at enhanced data rates. This invention is applicable and useful for both forward as well as reverse links when the total peak instantaneous throughput from the transmitting spread spectrum system is less than the chipping rate as well as when the instantaneous throughput from the transmitting spread spectrum system is more than the chipping rate. For convenience in exposition, this disclosure will emphasize the method as applicable to the forward link.

Numerous proposals have been made to support high data rate services in various spread spectrum communication technologies. As an evolution of IS-2000-1X, a proposal commonly referred to as HDR (high data rate) has been standardized to support high data rate services within the 1.25 MHz spectrum. In addition, proposals including the 1xEV-DV proposal have been put forward to support high data rate services as well as low data rate services within the same 1.25 MHz band. The high peak data rates in the above proposals are achieved using a combination of Walsh code aggregation, Walsh variable spreading factor method, and the use of higher order constellations such as 8-PSK, 16-QAM and 64-QAM.

FIG. 1 depicts an illustrative transmitter 100 in such a system. The transmitter comprises an encoder 110, an interleaver 120, a M-ary modulator 130, a serial-to-parallel converter 140, an array 150 of multipliers, a combiner 160, a multiplier 165 and an adaptation unit 170. Encoder 110 and interleaver 120 are conventional. Modulator 130 can be any one of a variety of M-ary modulators that encode a plurality of input bits using a higher order constellation such as QPSK, 8-PSK, 16-QAM or 64-QAM. The array of multipliers 150 code the modulated data from modulator 130 and converter 140 using Walsh codes $W_1$ through $W_N$ where N is the number of parallel streams from serial-to-parallel converter 140. Multiplier 165 spreads the data from combiner 160 using a pseudorandom noise (PN) code. Adaptation unit 170 adjusts the encoder 110, the modulator 130, and the serial-to-parallel converter 140 in accordance with the transmission characteristics of the transmission channel. In particular, adaptation unit 170 adjusts these elements so as to maximize the data transmission through the channel for the conditions then prevailing in the channel.

In operation, a data stream having a bit rate of R bits/second is received at an input to encoder 110 and is encoded as a bit stream of $R_S$ bits/second. The bit stream of $R_S$ bits/second is provided to interleaver 120 which scrambles the order of the bits so as to provide protection against transmission errors. The interleaved bit stream is then provided to M-ary modulator 130 which converts a plurality of input bits into an output symbol in accordance with the particular modulation technology used by the modulator. The serial stream of output symbols from M-ary modulator 130 is then converted to a parallel stream by serial-to-parallel converter 140 and the individual symbols in the parallel stream are then multiplied with Walsh codes $W_1$ through $W_N$. Finally, an output signal is formed by combining the Walsh-coded signals at combiner 160, spreading the signals by multiplying them with a pseudorandom noise signal and providing the spread signals to a transmitting antenna (not shown). Thus, a plurality of Walsh-encoded modulated symbols are transmitted simultaneously.

At the receiver, the symbols received at any time are separated by despreading the signals and multiplying them with Walsh codes and the separated signals are then demodulated in conventional fashion.

The use of higher order modulation techniques to achieve high data rates has several disadvantages. It requires a more complex and expensive RF front end arising from such requirements as the use of A/D converters having more bits, high rho-values to reduce the radio noise floor, and higher backoff for the power amplifier and results in lower ICI for the pulse shaping waveform, a lower noise figure, and greater sensitivity to inner receiver errors.

Code aggregation has certain advantages over the other two techniques depending on the operational scenario. However, if the code signals that are aggregated are only Walsh codes, the size of the set of Walsh codes limits the number of code signals that may be aggregated. In particular, the number of different Walsh codes, or of any set of orthogonal functions, of length N is only N. If any more code signals are to be aggregated, these would need to be non-orthogonal to the set of N Walsh codes.

In certain prior art operational scenarios in which the system is Walsh code-limited, alternative sets of orthogonal functions called quasi-orthogonal functions (QOF) have been included in the IS-2000 standard to accommodate more users. QOF's are functions that are generated by applying certain masks to each codevector in the Walsh code. A mask is simply a vector with 4-phase symbols (i.e., from the set $\{\pm 1; \pm j\}$) of length N. If the set of Walsh codes of length N is denoted as $W_N$, applying a mask $\underline{m}$ to a codevector $\underline{w} \in W_N$ refers to the componentwise multiplication of the vectors $\underline{m}$ and $\underline{w}$ to give the new vector $\underline{w}_m = \underline{w} \cdot \underline{m}$ of length N, where · denotes componentwise multiplication. For further information on QOF's see U.S. Pat. No. 6,240,143 which is incorporated herein by reference.

Applying the mask $\underline{m}$ to all the codevectors in $W_N$ (denoted as $W_N \underline{m}$), one obtains N additional codevectors. Thus, using a total of M masks on $W_N$, the size of the code signal set will be MN. Three masks in addition to the trivial mask, have been defined in IS-2000 such that the QOF's from different QOF sets have minimal cross correlation with each other as well as with the set of Walsh functions. See Tables 3.1.3.1.12-2 and 3.1.3.1.12-3 of the IS-2000 Standard.

The QOF's have minimal mini-max cross-correlation with the set of Walsh functions and therefore are optimal in this regard. Further, the QOF's have equal cross-correlation with every Walsh function of the same length. Further, the QOF's have certain optimal cross-correlation properties with Walsh functions of shorter length as would be needed with the use of shorter spreading factor Walsh functions for higher data rates.

SUMMARY OF THE INVENTION

We have devised both a high data transmitter and a high data receiver that uses both Walsh codes and quasi orthogonal functions in spreading and despreading transmitted and received signals.

In accordance with our invention, a high data rate spread spectrum transmitter comprises:

an encoder for encoding an input bit stream of R bits/second to produce an output bit stream of $R_s$ bits/second, an interleaver for scrambling the bits of the output bit stream of the encoder to produce an interleaved bit stream, a M-ary modulator for modulating the interleaved bit stream to produce a modulated bit stream, a serial-to-parallel converter to convert the modulated bit stream to a plurality of parallel bit streams;

a generator for generating a set of quasi orthogonal functions of a set of Walsh codes, an array of multipliers, each multiplier receiving one of the parallel bit streams and multiplying it with a Walsh code or a quasi orthogonal function of a Walsh code to produce a spread spectrum bit stream, and a combiner for combining the spread spectrum bit streams from the array of multipliers.

Further, in accordance with our invention, a high data rate spread spectrum receiver comprises:

an RF front end for receiving a received signal, a generator for generating a set of quasi orthogonal functions of a set of Walsh codes, a despreader for despreading the received signal using a Walsh code or a quasi orthogonal function to form a despread signal, a multi-user detection block for subtracting interference in the despread signal resulting from use of the quasi orthogonal functions to form a corrected signal, and a [rake] combiner for combining a plurality of corrected signals.

BRIEF DESCRIPTION OF DRAWINGS

These and other objects, features and advantages of the invention will be more readily apparent from the following detailed description of the invention in which.

DETAILED DESCRIPTION OF INVENTION

Transmitter

Figure 2:
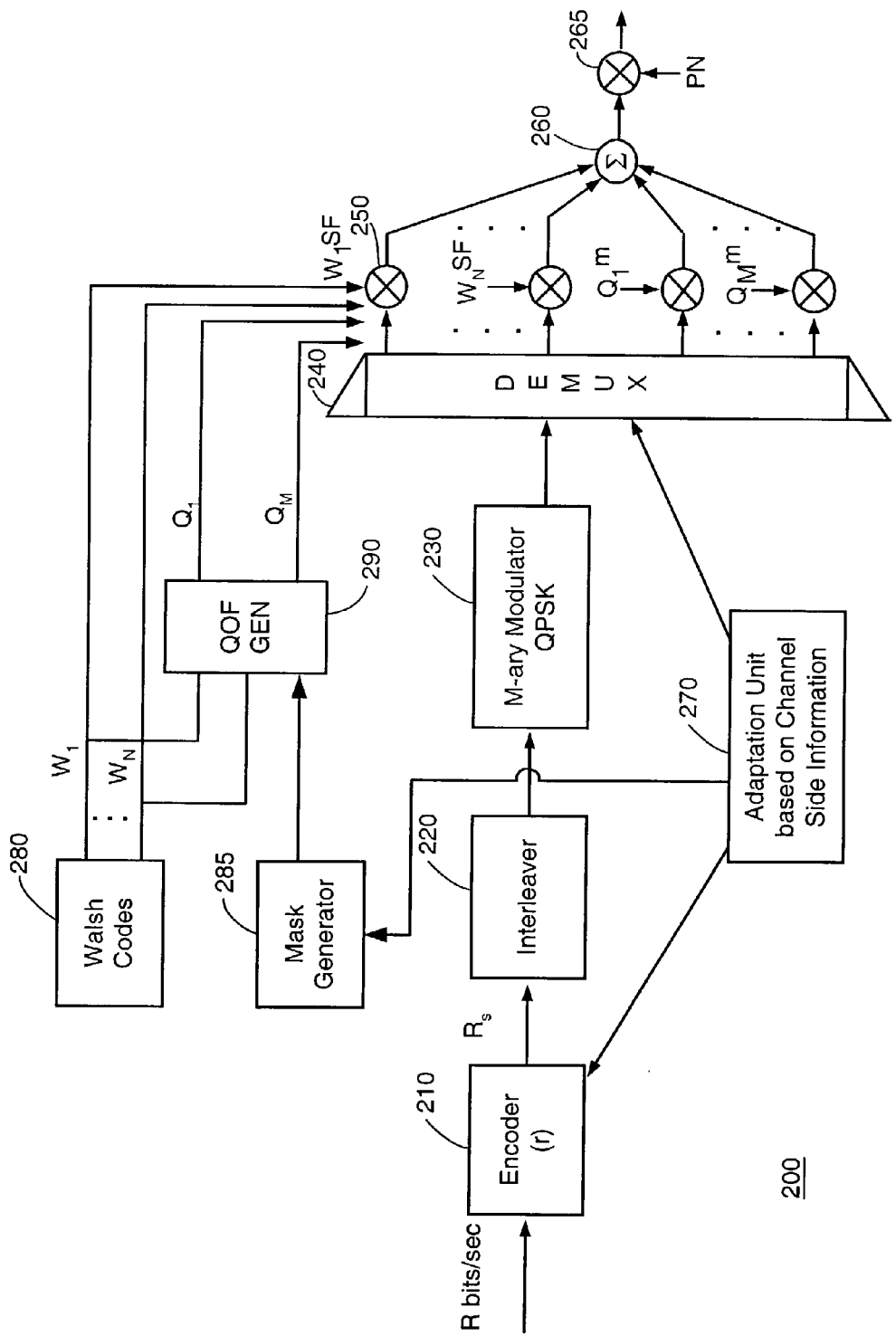
FIG. 2 is a block diagram depicting a high data rate transmitter of the present invention.

FIG. 2 depicts an illustrative transmitter 200 of the present invention. The transmitter comprises an encoder 210, an interleaver 220, a M-ary modulator 230, a serial-to-parallel converter 240, an array 250 of multipliers, a combiner 260, a multiplier 265, an adaptation unit 270, a source 280 of Walsh codes, a mask generator 285 and a quasi orthogonal function (QOF) generator 290. Encoder 210 and interleaver 220 are conventional. Modulator 230 can be any one of a variety of M-ary modulators that encode a plurality of input bits. Generator 290 generates QOFs by multiplying Walsh codes from source 280 on a componentwise basis with masks generated by mask generator 285. Each mask is simply a vector of 4-phase symbols, that is symbols from the set $\{\pm 1, \pm j\}$, of length N where N is both the length of each Walsh code and the total number of different Walsh codes. Thus, for each mask, generator 290 generates N quasi orthogonal functions.

Array 250 of multipliers spread the modulated data from modulator 230 and converter 240 using Walsh codes $W_1$ through $W_N$ and quasi orthogonal functions $Q_1$ through $Q_M$, where M+N is the number of parallel streams from serial-to-parallel converter 240. Adaptation unit 270 adjusts the encoder 210, the serial-to-parallel converter 240 and mask generator 285 in accordance with the transmission characteristics of the transmission channel. In particular, adaptation unit 270 adjusts these elements so as to maximize the data transmission through the channel for the conditions then prevailing in the channel.

In operation, a data stream having a bit rate of R bits/second is received at an input to encoder 210 and is encoded as a bit stream of $R_S$ bits/second. The bit stream of $R_S$ bits/second is provided to interleaver 220 which scrambles the order of the bits so as to provide protection against transmission errors. The interleaved bit stream is then provided to M-ary modulator 230 which converts a plurality of input bits into an output symbol in accordance with the particular modulation technology used by the modulator. The serial stream of output symbols from M-ary modulator 230 is then converted to a parallel stream by serial-to-parallel converter 240 and the individual symbols in each parallel stream are then spread by multiplying them with one of Walsh codes $W_1$ through $W_N$ or quasi orthogonal function $Q_1$ through $Q_M$. Finally, an output signal is formed by combining the spread signals at combiner 260, spreading them at multiplier 265 by multiplying them with a pseudorandom noise (PN) signal and providing the spread signals to a transmitting antenna (not shown). Thus, a plurality of Walsh-encoded or QOF encoded symbols are transmitted simultaneously. Since more codes are available to code the modulated signals, the same bit rate can be achieved in the transmission channel as in prior art systems but with the use of a lower-order modulator constellation.

Receiver

Figure 3:
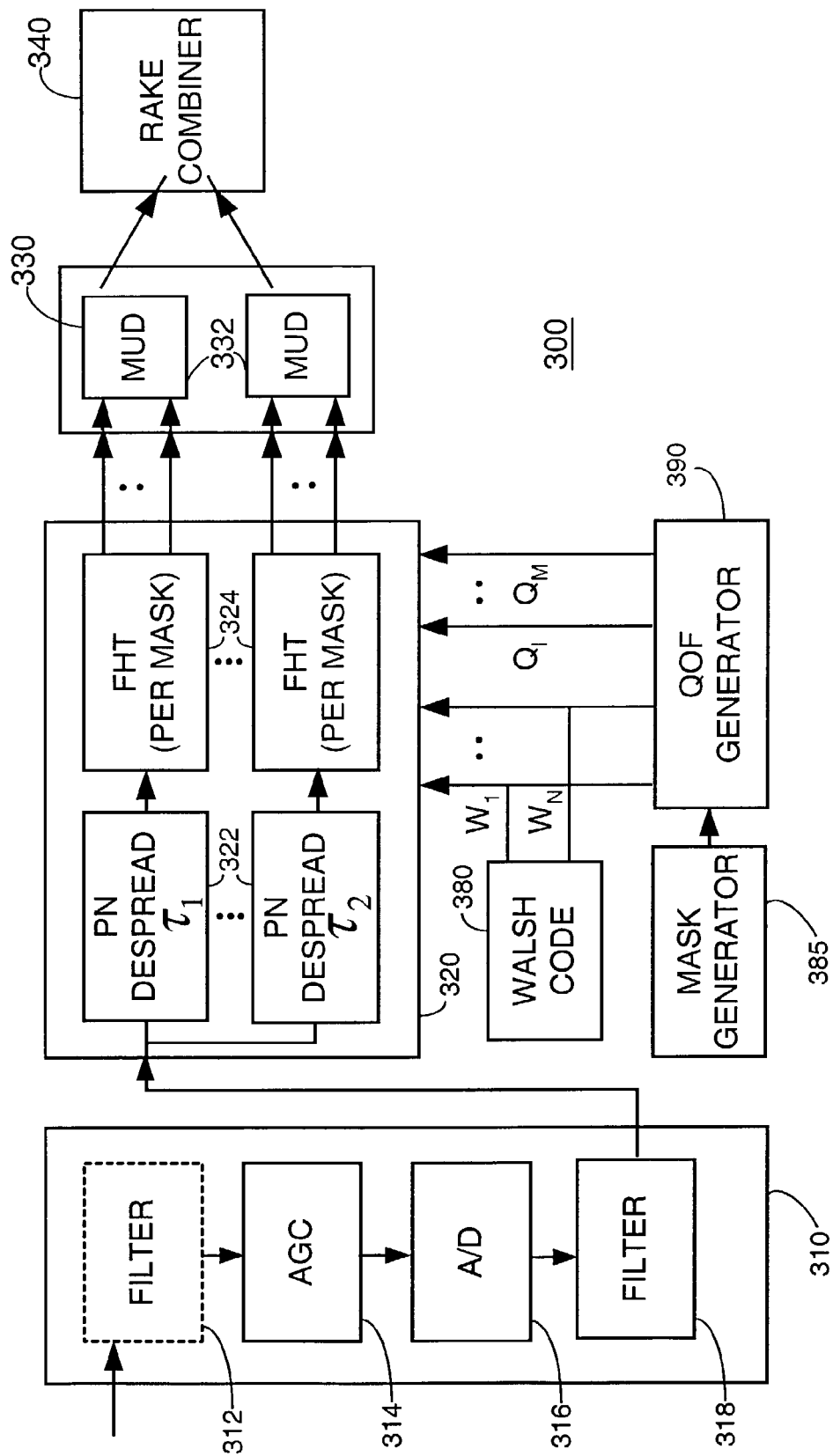
FIG. 3 is a block diagram depicting a high data rate receiver of the present invention.

FIG. 3 depicts an illustrative receiver 300 of the present invention. The receiver comprises an RF front end 310, a despreader 320, a multi-user detection block 330, a rake combiner 340, a source 380 of Walsh codes, a mask generator 385, and a quasi orthogonal function (QOF) generator 390. QOF generator 390 functions the same as QOF generator 290 to generate QOFs by multiplying Walsh codes with masks generated by mask generator 385. In particular, mask generator 385 supplies QOF generator 390 with the same masks as supplied by mask generator 285 and QOF generator 390 multiplies the same Walsh codes on a componentwise basis with these masks so as to generate at receiver 300 the same QOFs as were generated at transmitter 200. Thus, Walsh codes $W_1$ through $W_N$ and QOF codes $Q_1$ through $Q_M$ are supplied to despreader 320.

The RF front end receives an analog signal from one or more antennae (not shown). The front end comprises an automatic (A/D) converter 316 and a digital filter 318. In an alternative embodiment, an analog filter 312 (shown in a dotted block) may be used on the analog side in place of or in addition to digital filter 318. The front end circuitry is conventional.

Despreader 320 comprises multiple channels or fingers each of which includes a PN despreader 322 and a fast Hadamard transformer 324. Multiple copies of the same transmittal signal may be received by the receiver at slightly different times due to differences in the length of various propagation paths from the transmitter to the receiver. In a spread spectrum communication system, it is advantageous to process several of these copies in different channels in the despreader, align the copies in phase and combine them to produce an enhanced signal. PN despreader 322 despreads the signal from the RF front end using the same pseudorandom noise signal that was used to spread the signal at the transmitter. The despreaders of the different channels operate at slightly different time delays τ so as to detect different multipath signals. The fast Hadamard transformer includes a separate transformer for each mask that is used to generate QOF's as well as a transformer for use in processing the Walsh codes.

The output from each FHT 324 in each channel of the despreader is supplied to a multi-user detection sub-block 332 in the corresponding channel of multi-user detection block 330. The total number of outputs from an FHT 324 in one channel to the MUD sub-block in that channel is equal to the sum of the number of Walsh codes and QOFs. Thus, in FIG. 3, the total number of outputs in one channel is N+M.

In operation, a signal from transmitter 200 is received at an antenna (not shown) and supplied to RF front end 310 of receiver 300. After processing by the front end, the received signal is supplied to despreader 320 which multiplies the received signal at each PN despreader 322 by the same pseudorandom noise signal as was used to spread the signal at the transmitter. The signals from the despreaders are then provided to the FHTs 324 where they are multiplied by Walsh codes from Walsh code source 380 and the QOFs from QOF generator 390 so as to despread the different symbols that were received simultaneously at the receiver. Further processing of the despread signals is performed by multi-user detection block 330 which compensates for the interference between received symbols that arises from use of QOFs by subtracting out this interference. The corrected signals are then provided to rake combiner 340 which combines the same signal received over transmission paths of different length.

Figure 4:
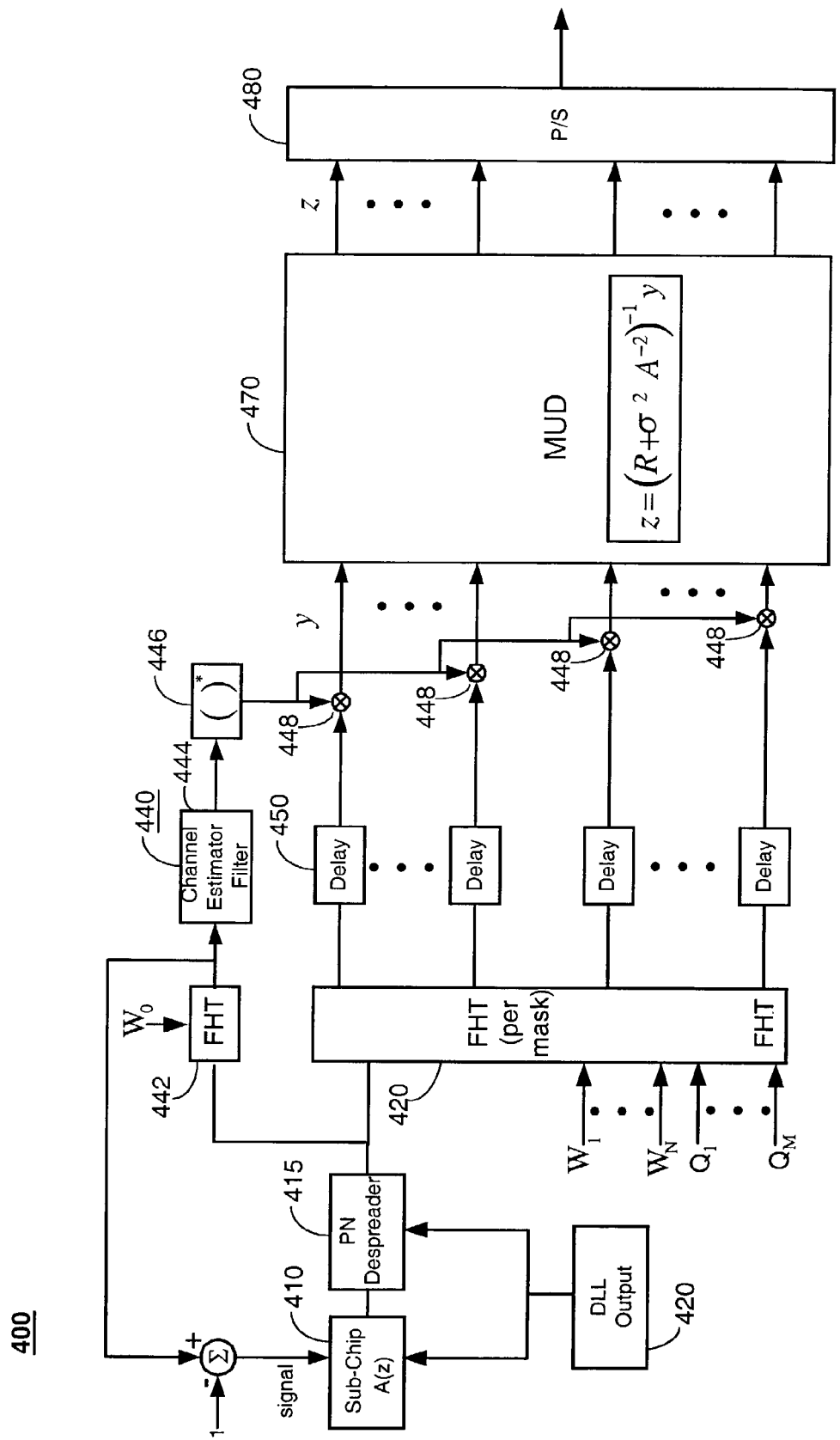
FIG. 4 is a block diagram depicting an alternative high data rate receiver of the present invention.

FIG. 4 is a block diagram depicting further details of an alternative embodiment of the receiver in FIG. 3. The receiver comprises a sub-chip equalizer 410, a PN despreader 412, a delay-locked loop output 414, fast Hadamard transformers (FHT) 420, a channel estimator 440, delays 450, a multi-user detection block 470 and a parallel/serial converter 480. FHT 420 is essentially the same as an FHT 324 of FIG. 3. It receives Walsh codes $W_1$–$W_N$ and QOFs $Q_1$–$Q_M$ from a Walsh code generator, mask generator and QOF generator that are the same as that of FIG. 3. And it, produces a total number of outputs N+M that is the sum of the number of Walsh codes and QOFs. Channel estimator includes a fast Hadamard transformer 442, a channel estimator filter 444, a conjugator 446, and multipliers 448 in each of the outputs from the array of FHTs 420.

In operation the received signal is sampled by the sub-chip equalizer 410 which combines any multipath signal that is received. After the signal is processed by the sub-chip equalizer, the signal is despread by despreader 412 using the same pseudorandom noise signal PN used in the transmitter with which the receiver is communicating. As a result, any signals received from other transmitters appear noiselike. The filtered signal is further despread by multiplying it at multiplier array 430 with Walsh codes $W_1$–$W_N$ and QOFs $Q_1$–$Q_M$.

Channel estimator 440 is used to compensate for any phase rotation that equalizer 410 could not compensate for. FHT 442 multiplies the signal from despreader 412 with the Walsh code $W_0$ which is a vector of 1's. The output of FHT 442 is filtered by channel estimator filter 444 and conjugated by conjugator 446. Delays 450 in the output lines from FHT 420 compensate for processing delays in the channel estimator. Finally, the output of the conjugator is multiplied by multipliers 448 with the signal from each of delays 450 and the output of the multipliers is supplied to multi-user detection (MUD) block 470. MUD block 470 illustratively is the same as one of the MUD sub-blocks 332 of FIG. 3. MUD block 470 subtracts out interference arising from the use of QOFs. Finally the multi-user detection block outputs are converted to a serial stream by parallel/serial converter 480.

Figure 5:
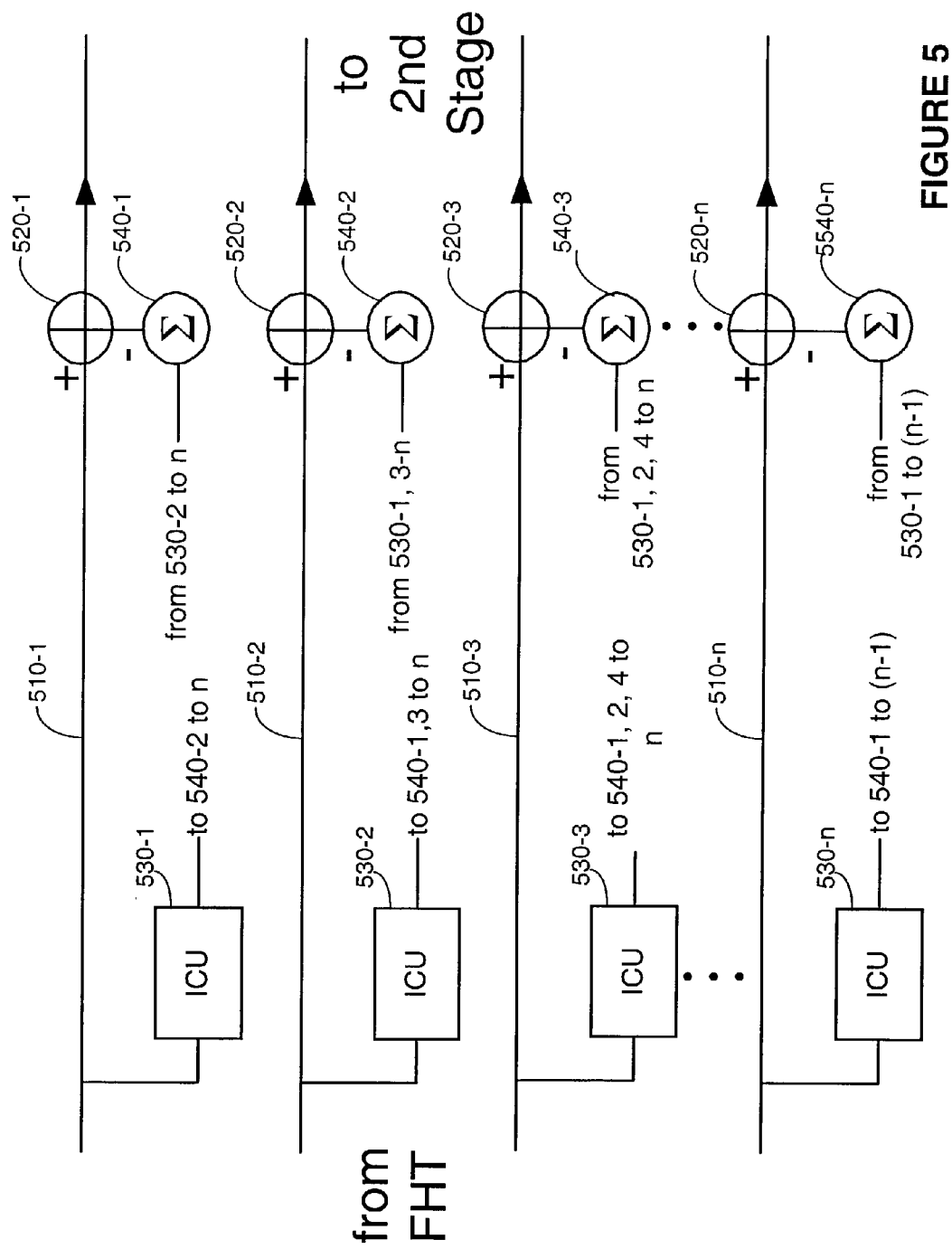
FIG. 5 is a block diagram depicting details of a parallel interference cancellation implementation of the multi-user detection block.

FIG. 5 depicts a parallel interference cancellation implementation of a multi-user detection block 500. The block comprises a set of input lines 510-1 to n, for example, from one channel of a despreader circuit 320 of FIG. 3 or from multipliers 448 of FIG. 4; a set of adders 520-1 to n; interference cancelling units (ICU) 530-1 to n; and a set of summers 540-1 to n. As shown in FIG. 4, there is an adder 520 in each input line with the input line connected to its summing input, an ICU 530 connected to each input line and a summer 540 connected to a subtracting input of each adder 520. The adder, ICU and summer that are connected to the same input line have the same suffix numeral. Each of the ICUs provides an input to each of the summers except the summer that is connected to the adder in the same input line to which that ICU is connected. Thus, the function of each adder is to subtract from the signal on the line to which it is connected the sum of the outputs of the ICUs connected to all the other lines.

The interference cancellation circuitry compensates for any residual variability in the received signal that the equalizer is unable to compensate for. If desired, additional stages of cancellation circuitry may be used.

Since signals from distinct QOF sets are non-orthogonal, a simple matched filter detector may result in significant capacity loss. Thus we next discuss the system model and joint multi-channel detection techniques for a single user. We also provide corresponding capacity gains, on the forward link in the system to suppress single-path non-orthogonal interference.

System Model Equations

Figure 1:
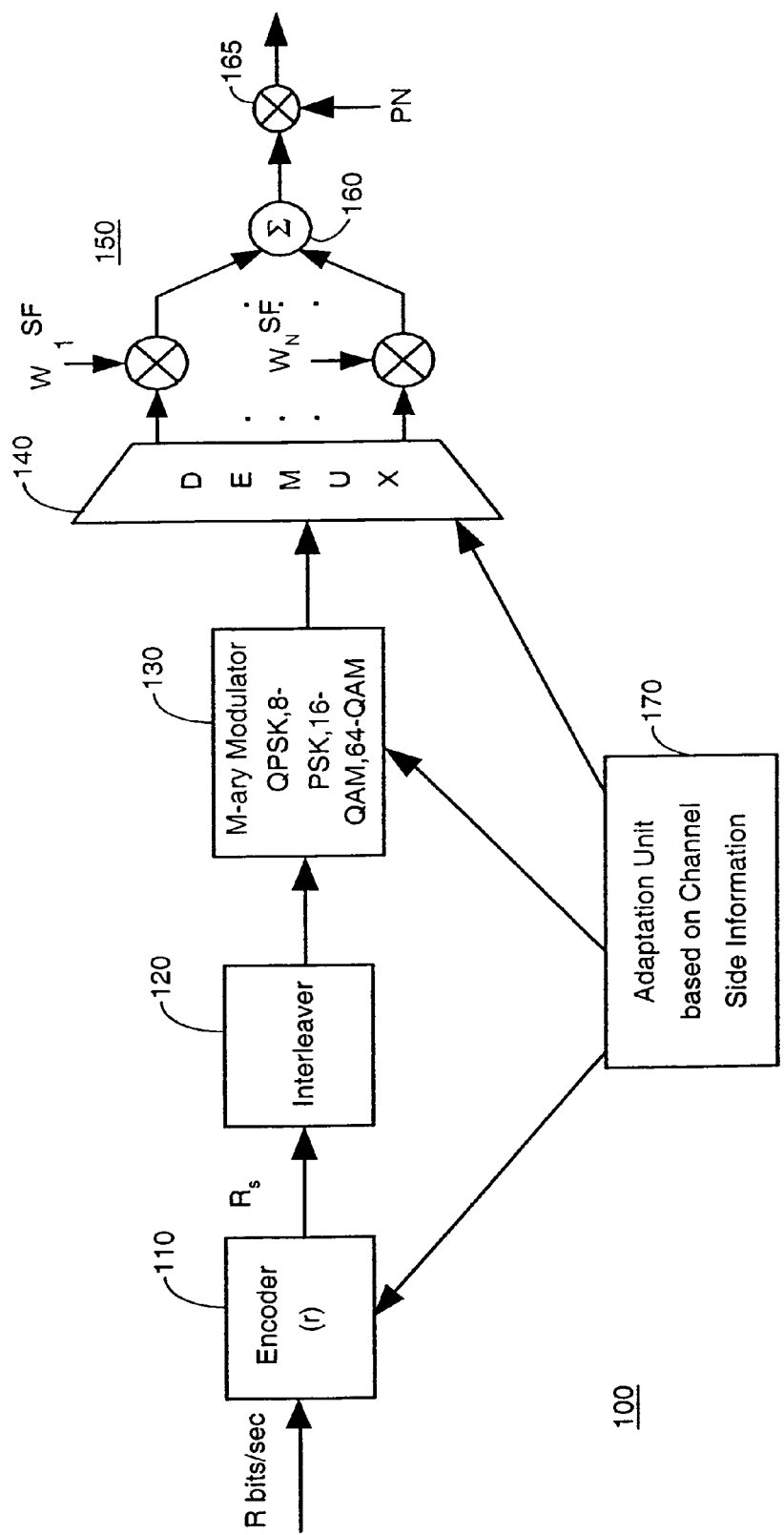
FIG. 1 is a block diagram depicting a prior art high data rate transmitter.

The composite transmit waveform sent from transmitter 100 as depicted in FIG. 1, may be expressed as $$S_{tr}(t) = \text{Re}\{s(t)e^{j2\pi f_c t}\}$$

where $f_c$ is the carrier frequency. The baseband transmit signal within a symbol interval may then be expressed as, $$s(t) = \sum_{k=0}^{\infty} \sum_{i=0}^{N_H-1} \overline{A_i[\lfloor k/K \rfloor] \cdot c_i[k]} \cdot g(t - kT_c)$$
$$= \sum_{k=0}^{\infty} \sum_{m=0}^{M-1} \sum_{n=0}^{K-1} A_n^m[\lfloor k/K \rfloor] Q_n^m[k \bmod K] a_n^m[\lfloor k/K \rfloor] c[k] g(t - kT_c)$$

where:
  g(t) is the chip pulse-shaping filter (with energy normalized to the chip time $T_c$),
  M is the number of QOF masks used,
  K is the size of the Walsh code set, $N_u = K \cdot M$ is the total number of code channels on the forward link, $c[k] \in \{\pm 1; \pm j\}$ is the complex pseudo-random (PN) scrambling sequence at chip-rate, $$\overline{A_i}[l] = A_n^m[l]$$

is the transmit code channel gain at symbol time l for the code channel channelized by the QOF function $$Q_n^m,$$

$$a_n^m[b]$$

is a complex-valued QPSK or QAM data symbol, for symbol time b for the code channel channelized by the QOF function $$Q_n^m$$

(energy normalized to 1), $$Q_k^m[n]$$

is the QOF generated applying the mask m to the Walsh function $w_k$, $\bar{c}_l[k]$ is the product of the channelization code, symbol sequence and complex PN code at chip rate.

In the important special case that all the K·M (or less) forward link code channels are used to increase the data rate for a single mobile, it may be assumed that $$A_n^m[b]$$

is a constant across all n,m. This is akin to the approach with IS-2000 HDR standard, in which the entire Base Station transmit power is used to achieve high data rate for each mobile, and transmissions to different mobiles are multiplexed in a TDM manner. The IS-2000 HDR standard is illustrated in P. Bender et al, "CDMA/HDR: A Bandwidth Efficient High Speed Wireless Data Service for Nomadic Users," IEEE Commun. Mag. Vol. 38, Issue 7, pp. 70–77, July, 2000, which is incorporated by reference. Henceforth, we assume that $$A_n^m[b]$$

is a constant across all the K·M code channels, and thus, we will simplify the notation as $$A_n^m[b] = A[b].$$

The received waveform at the mobile antenna of receiver 300 as depicted in FIG. 3 may be expressed as r(t)=s(t)*h(t)+z(t) where z(t) represents the other-cell interference plus thermal noise modeled as a white Gaussian random process with power spectral density $$\frac{I_{oc} + N_0}{2}.$$

For cases where the chip duration is much smaller than the channel delay spread, the channel appears to be frequency selective relative to the transmitted signal and therefore, the channel impulse response is modeled as a linear system given by $$h(t) = \sum_{l=1}^{L} \beta_l \delta(t - \tau_l),$$

where $\beta_l = |\beta_l| e^{j\Theta_l}$ is the complex time-varying fading channel gain of the $l^{th}$ path and $\tau_l$ is the associated time-delay. It is assumed that $|\tau_l - \tau_m| > T_c$ for $l \neq m$, i.e. the rays are resolvable. Note that $$\left| \frac{1}{K} \sum_{k=0}^{K-1} Q_n^m[k] Q_j^i[k]^* \right| = \begin{cases} 1/\sqrt{K}, & \text{if } m \neq i \\ 0, & \text{if } m = i, n \neq j \\ 1, & \text{if } m = i, n = j \end{cases}$$

In this analysis, the following assumptions are made:
1. Perfect estimation of the frequency offset (due to mismatch of the transmitter and receiver's local oscillator as well as the effect of the Doppler shift)
2. Ideal timing recovery, i.e. no delay-lock loop error due to finger time tracking.

The received signal, r(t), is first passed through a chip matched filter g* ($T_c$–t). Then the output for the $l^{th}$ finger after dechannelization by $Q_n^m[k]$ for the $0^{th}$ symbol (without loss of generality) is given by:

$$Z_n^m[l] = \frac{1}{\sqrt{KT_c}} \sum_{k=0}^{K-1} \int_{(k-1)T_c + \tau_l}^{kT_c + \tau_l} r(t) Q_n^m[k]^* c^*[k] g(t - kT_c - \tau_l) dt \quad (1)$$

We will denote, $g(t)*g^*(T_c-t)=f(t)$, where $f(t)=1$ for $t=0$ for $$t = \pm T_c, \pm 2T_c, \ldots$$

Equation (1) can be simplified to $$Z_n^m[l] = \beta_l A[0] a_n^m[0] \sqrt{KT_c} + I_{QO,n}^m[l] + I_{MP,n}^m[l] + U_n^m[l] \quad (2)$$

The first term in Eq. (2) represents the desired quantity while the other terms contribute as interference and noise.

It can be easily shown that $$U_n^m[l] = \frac{1}{\sqrt{KT_c}} \sum_{k=0}^{K-1} \int_{(k-1)T_c+\tau_l}^{kT_c+\tau_l} z(t)Q_n^m[k]c^*[k]g(t-kT_c-\tau_l)dt$$

is a complex zero-mean Gaussian random variable with variance given by $(I_{oc}+N_o)/2$ per real/imaginary component.

The second term in Equation (2) represents the interference due to non-zero cross-correlation between different QOF sets, $$I_{QO,n}^m[l] = \beta_{l,n}^m \sum_{m'=0, m' \neq m}^{M-1} \sum_{i=0}^{K-1} A[0]a_n^m[0]v_{n,i}^{m,m'}$$

where $$v_{n,i}^{m,m'} = \frac{1}{\sqrt{K}} \sum_{k=0}^{K-1} Q_n^m[k] \cdot Q_i^{m'}[k]^*$$

Due to the properties of the correlation between QOF sets, we have $$v_{n,i}^{m,m'} \in \{\pm 1; \pm j\}, \forall n, i, m, m'(m' \neq m).$$

The third term in Equation (2) represents self-interference due to multipath $$I_{MP}(l) = \sum_{i=1, i \neq l}^{N} \beta_i F_i(l)$$

where $$F_i(l) = \frac{1}{\sqrt{KT_c}} \sum_{k=0}^{K-1} Q_n^m[k]^* c^*[k] \int_{kT_c+\tau_l}^{(k+1)T_c+\tau_l} s(t-\tau_i)g(t-kT_c-\tau_l)dt$$

This modeling of auto-correlation between the code sequences assumes the sequence to be random, typically constructed using the same long code PN masking sequence (as in IS-95) as the scrambling code for all the code channels. With this assumption, $F_i$ remains statistically the same for all the MK code channels.

It is easy to show that $F_i(l)$ has zero mean and further, the variance of $F_i(l)$ may be shown to be as follows:

$$\text{Var}(F_i(l)) = MK[f((\tau_l-\tau_i) \bmod T_c)]^2 A[0]^2$$

Further, it can be shown that $$E[F_i(l)F_j^*(l)] \approx M \cdot K \cdot f((\tau_j-\tau_i) \bmod T_c) A[0]^2$$

Finally, the multi-path receiver at the MS is commonly a rake receiver as shown at 340 in FIG. 3, but may alternatively be a more complex but higher-performance IPI (inter-path interference) equalizer. The rake receiver coherently combines the outputs of each finger such that the input to the deinterleaver is $$X_n^m[0] = \sum_{l=1}^{L} \text{Re}\left(Z_n^m[l] \frac{\hat{\beta}_l^*}{\sigma_l^2}\right)$$

$$= \text{Re}\left(\begin{array}{c} A[0]a_n^m[0]\sqrt{KT_c} \sum_{l=1}^{L} \frac{\beta_l \hat{\beta}_l^*}{\sigma_l^2} + \\ \sum_{l=1}^{L} \frac{\hat{\beta}_l^* I_{QO,n}^m[l]}{\sigma_l^2} \end{array}\right) + I_{MP} + U_n^m$$

where L is the number of fingers at the MS receiver, $\hat{\beta}_n$ is an estimate of the complex fading path gain, and $$\sigma_l^2 = \text{Var}(I_{MP}(l)) + \text{Var}(U_n^m)$$

Further, $$I_{MP} = \sum_{l=1}^{L} \frac{\hat{\beta}_l^*}{\sigma_l^2} I_{MP}(l)$$

can be shown to have zero mean and variance given by $$\text{Var}(I_{MP}) = \sum_{l=1}^{L} \sum_{l'=1, l' \neq l}^{L} \frac{|\beta_l|^2}{\sigma_l^4} |\beta_{l'}|^2 A[0]^4 MK \left[\begin{array}{c} f((\tau_l-\tau_{l'}) \bmod T_c)^2 + \\ 2f((\tau_l-\tau_{l'}) \bmod T_c) \end{array}\right]$$

$$U_n^m = \sum_{l=1}^{L} \hat{\beta}_l^* U_n^m[l]$$

may be shown to have zero mean and variance given by $$\text{Var}(U_n^m) = \frac{I_{oc}+N_0}{2 \cdot KT_c} \sum_{l=1}^{L} |\beta_l|^2$$

Interference Suppression Techniques

Due to the non-orthogonality between the QOF sets, even when the base system supports a single high data rate user within any time slot, there can be significant loss of capacity if the soft decision statistics as in Equation (2) are input to the channel decoder without further processing to suppress interference. Note that we have restricted to the important special case that all the MK forward link code channels are used to increase the data rate for a single mobile and thus, $$A_n^m[l]$$

is constant across all n,m. It should however be noted that much of the analysis will also carry over to the more general case of multiple mobiles supported within the same time slot. We will initially consider the case of no multi-path, i.e., $I_{MP}(l)=0$, $\forall l \neq 0$, in Equation (2) and then extend the results for the multi-path case.

A. No Multipath Case

Equation (2) can be re-written as follows:

$$Z = \beta \cdot A[0] R \underline{a} + \underline{U}$$

where $$Z = [Z_0^0 \cdots Z_{K-1}^0 Z_0^1 \cdots Z_{K-1}^1 \cdots Z_{K-1}^{M-1}]^T$$

$$\underline{U} = [U_0^0 \cdots U_{K-1}^0 U_0^1 \cdots U_{K-1}^1 \cdots U_{K-1}^{M-1}]^T$$

$$\underline{a} = [a_0^0 \cdots a_{K-1}^0 a_0^1 \cdots a_{K-1}^1 a_{K-1}^{M-1}]^T;$$

and the correlation matrix R as defined below.

$$R = \frac{1}{\sqrt{KT_c}} \begin{bmatrix} \sqrt{KT_c} & 0 & \cdots & 0 & v_{0,0}^{0,1} & v_{0,1}^{0,1} & v_{0,K-1}^{0,1} & \cdots & v_{0,0}^{0,M-1} & \cdots & v_{0,K-1}^{0,M-1} \\ 0 & \sqrt{KT_c} & & \vdots & v_{1,0}^{0,1} & & & & & & \\ \vdots & & \ddots & 0 & \vdots & & \vdots & & \vdots & & \\ 0 & 0 & \sqrt{KT_c} & v_{K-1,0}^{0,1} & & v_{K-1,K-1}^{0,1} & & & & & \\ v_{0,0}^{1,0} & \cdots & & v_{0,K-1}^{1,0} & \sqrt{KT_c} & 0 & 0 & & \vdots & & \vdots \\ v_{1,0}^{1,0} & & & \vdots & 0 & \sqrt{KT_c} & \vdots & & & & \\ \vdots & & & \vdots & & \vdots & 0 & & & & \\ v_{K-1,0}^{1,0} & & & v_{K-1,K-1}^{1,0} & 0 & \cdots & 0 & \sqrt{KT_c} & & & \\ \vdots & & & \vdots & & & & \vdots & v_{0,K-1}^{M-2,M-1} & \cdots & v_{K-1,K-1}^{M-2,M-1} \\ v_{0,0}^{M-1,0} & & & & & & & v_{0,0}^{M-1,M-2} & \sqrt{KT_c} & 0 & \cdots & 0 \\ \vdots & & & & & & & & 0 & \ddots & \\ & & & & & & & & \vdots & & \\ v_{K-1,0}^{M-1,0} & \cdots & & & & & & v_{K-1,K-1}^{M-1,M-2} & 0 & \cdots & 0 & \sqrt{KT_c} \end{bmatrix}$$

By exploiting the structure of the cross-correlation matrix R, it is possible to design low-power interference suppression algorithms.

The decorrelating detector computes the term:

$$\underline{Y} = R^{-1} Z$$

and uses this as the soft inputs to the decoder. Note that with hard decision detection, the bit error probability with the decorrelating detector is $$P_b(e) = Q\left(\frac{\sqrt{\beta A[0]}}{\sigma \sqrt{\det(R^{-1})}}\right)$$

where $\sigma$ is the variance of each component of $\underline{U}$. The decorrelating detector attempts to eliminate multi-user interference at the expense of noise enhancement. Even with the simple decorrelator, it can be shown by manipulating the structure of the matrix $R^{-1}$, that the noise enhancement (need more work here) is only of the order $$\frac{\sqrt{M}}{K}.$$

The minimum mean square error (MMSE) detector computes the following:

$$\underline{Y} = \left(R + \frac{\sigma^2}{A[0]^2} I\right)^{-1} Z$$

The bit error probability with the MMSE detector if hard decisions were carried out with the MMSE detector is then given via:

$$P_b(e) = Q\left(\frac{\sqrt{\beta A[0]}}{\sigma \sqrt{\det(R + \sigma^2 I)^{-1}}}\right)$$

In addition to the above schemes, the multi-user interference may also be suppressed using interference cancellation schemes such as successive interference cancellation (SIC) and parallel interference cancellation, which can be of substantially lower complexity by exploiting the structure of the cross-correlation matrix R.

B. Presence of Multipath

In the presence of multipath, either the rake combiner or for even more performance enhancements, inter-path interference (IPI) equalization may be used to mitigate the effects with either approach. This is illustrated in A. Klein, "Data Detection Algorithms Specially Designed for the Downlink of CDMA Mobile adio Systems," Proc. IEEE Veh. Tech. Conf. Pp. 203–207, (Phoenix, Ariz.), May 4–7, 1997, which is incorporated by reference. IPI equalization provides useful gains particularly when high data rate users are supported by the system.

While the present invention has been described in terms of specific embodiments, it will be recognized by those skilled in the art that numerous alternatives may be practiced within the spirit and scope of the attached claims.

What is claimed is:

1. A high data rate spread spectrum receiver comprising:
an RF front end for receiving a signal;
a generator for generating a set of quasi orthogonal functions (QOF) and a set of Walsh codes;
a despreader, which has a plurality of PN despreaders and a plurality of respective, parallel fast Hadamard transformers (FHT) each corresponding to one multipath, for despreading the received signal to form a plurality of despread signals corresponding to the set of quasi orthogonal functions and the set of Walsh codes;
a multi-user detection block having a plurality of multi-user detectors for subtracting interference in the plurality of despread signals resulting from use of the quasi orthogonal functions and the set of Walsh codes to form plurality of corrected signals; and
a combiner for combining the plurality of corrected signals.

2. The high data rate spread spectrum receiver of claim 1 where the multi-user detection block is configured to exploit the mini-max cross-correlation between the QOF's and the set of Walsh functions.

3. The high data rate spread spectrum receiver of claim 1 where the multi-user detection block is configured to exploit the equal cross-correlation between the QOF's and every Walsh function of the same length.

4. The high data rate spread spectrum receiver of claim 1 wherein the multi-user detection block is configured to exploit the optimal cross-correlation properties between the QOF's and Walsh functions of shorter length as would be needed with the use of shorter spreading factor Walsh functions for higher data rates.

5. The high data rate spread spectrum receiver of claim 1 wherein the multi-user detection block is configured to exploit the optimal cross-correlation properties the QOF's from different QOF sets have with each other as well as with the set of Walsh functions.

6. The high data rate spread spectrum receiver of claim 1 wherein the multi-user detection block is configured to utilize parallel interference cancellation.

7. The high data rate spread spectrum receiver of claim 1 wherein the multi-user detection block is configured to utilize successive interference cancellation.

8. The high data rate spread spectrum receiver of claim 1 wherein the combiner is a rake combiner.

9. The high data rate spread spectrum receiver of claim 1 wherein the combiner is an inter-path interference equalizer (IPI).

10. Communication apparatus for communicating over a transmission channel comprising:
a high data rate spread spectrum transmitter comprising:
an encoder for encoding an input bit stream of R bits/second to produce an output bit stream of R.sub.S bits/second;
an interleaver for scrambling the bits of the output bit stream of the encoder to produce an interleaved bit stream;
a M-ary modulator for modulating the interleaved bit stream to produce a modulated bit stream;
a serial-to-parallel converter to convert the modulated bit stream to a plurality of parallel bit streams;
a generator for generating a set of quasi orthogonal functions of a set of Walsh codes;
an array of multipliers, each multiplier receiving one of the parallel bit streams and multiplying it with a Walsh code or a quasi orthogonal function of a Walsh code to produce a spread spectrum bit stream; and
a combiner for combining the spread spectrum bit streams from the array of multipliers to form a signal to be transmitted over the transmission channel; and a high data rate spread spectrum receiver comprising:
an RF front end for receiving a signal from the transmission channel;
a generator for generating a set of quasi orthogonal functions and a set of Walsh codes;
a despreader, which has a plurality of PN despreaders and a plurality of respective, parallel fast Hadamard transformers (FHT) each corresponding to one multipath, for despreading the received signal to form a plurality of despread signals corresponding to the set of quasi orthogonal functions and the set of Walsh codes;
a multi-user detection block having a plurality of multi-user detectors for subtracting interference in the plurality of despread signals resulting from use of the quasi orthogonal functions and the set of Walsh codes to form a plurality of corrected signals; and
a combiner for combining the plurality of corrected signals.

11. The communication apparatus of claim 10 where the multi-user detection block is configured to exploit the mini-max cross-correlation between the QOF's and the set of Walsh functions.

12. The communication apparatus of claim 10 where the multi-user detection block is configured to exploit the equal cross-correlation between the QOF's and every Walsh function of the same length.

13. The communication apparatus of claim 10 wherein the multi-user detection block is configured to exploit the optimal cross-correlation properties between the QOF's and Walsh functions of shorter length as would be needed with the use of shorter spreading factor Walsh functions for higher data rates.

14. The communication apparatus of claim 10 wherein the multi-user detection block is configured to exploit the optimal cross-correlation properties the QOF's from different QOF sets have with each other as well as with the set of Walsh functions.

15. The communication apparatus of claim 10 wherein the multi-user detection block is configured to utilize parallel interference cancellation.

16. The communication apparatus of claim 10 wherein the combiner is a rake combiner.

17. The communication apparatus of claim 10 wherein the combiner is an inter-path interference equalizer (IPI).

* * * * *

UNITED STATES PATENT AND TRADEMARK OFFICE
CERTIFICATE OF CORRECTION

PATENT NO.         : 7,133,433 B2                               Page 1 of 1
APPLICATION NO. : 10/226666
DATED              : November 7, 2006
INVENTOR(S)        : Louay Jalloul et al.

It is certified that error appears in the above-identified patent and that said Letters Patent is hereby corrected as shown below:

In Other Publications:

Klein, A., Data Detection Algorithms Specially Designed for the Dwonlink of CDMA Mobile Radio Systems; IEEE Veh. Tech. Conf.; p. 203-207; May 4-7, 1997.* "Dwonlink" should read --Downlink--

Column 7, line 39, " $\overline{c}_l[k]$ " should read -- $\overline{c}_i[k]$ --

Column 10, line 13, " $\sum_{l=1}^{L}$ " should read - $+\sum_{l=1}^{L}$ -

Column 11, lines 30 and 35, " $\vdots$ " should read -- $\ddots$ -- (2 instances)

Column 12, line 66, "adio" should read --radio--

In the Claims:

In Claim 1, line 23, "form plurality" should read --form the plurality--

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,133,433 B2  Page 1 of 1
APPLICATION NO. : 10/226666
DATED : November 7, 2006
INVENTOR(S) : Louay Jalloul et al.

It is certified that error appears in the above-identified patent and that said Letters Patent is hereby corrected as shown below:

In Other Publications:

Klein, A., Data Detection Algorithms Specially Designed for the Dwonlink of CDMA Mobile Radio Systems; IEEE Veh. Tech. Conf.; p. 203-207; May 4-7, 1997.* "Dwonlink" should read --Downlink--

Column 7, line 39, " $\overline{c}_{i\!/}[k]$ " should read -- $\overline{c}_i[k]$ --

Column 10, line 13, " $\sum_{l=1}^{L}$ " should read -- $+\sum_{l=1}^{L}$ --

Column 11, lines 30 and 35, " $\vdots$ " should read -- $\ddots$ -- (2 instances)

Column 12, line 66, "adio" should read --radio--

In the Claims:

Column 13, In Claim 1, line 23, "form plurality" should read --form the plurality--

This certificate supersedes the Certificate of Correction issued August 19, 2008.

Signed and Sealed this

Sixteenth Day of September, 2008

JON W. DUDAS
*Director of the United States Patent and Trademark Office*